April 3, 1945.   O. W. LIVINGSTON   2,372,964
ELECTRIC VALVE CONTROL SYSTEM
Filed June 19, 1941

Inventor:
Orrin W. Livingston,
by Harry E. Dunham
His Attorney.

Patented Apr. 3, 1945

2,372,964

UNITED STATES PATENT OFFICE 2,372,964

ELECTRIC VALVE CONTROL SYSTEM

Orrin W. Livingston, Scotia, N. Y., assignor to General Electric Company, a corporation of New York Application June 19, 1941, Serial No. 398,807

9 Claims. (Cl. 175—363)

My invention relates to electric valve control systems for electric valve translating apparatus, and more particularly to excitation means for energizing the control members of electric valve apparatus of the type employing a control member.

In electric valve translating systems, particularly in polyphase converting systems such as polyphase rectifiers and inverters, it is frequently desirable to provide apparatus for controlling accurately an electrical condition, such as the voltage impressed on an associated load circuit. In accordance with the teachings of my invention described hereinafter, I provide a new and improved control system for translating apparatus wherein accurate and precise control of an electrical condition of an associated circuit may be obtained without employing apparatus of an expensive or complicated nature.

It is an object of my invention to provide a new and improved control system for electric valve translating apparatus.

It is another object of my invention to provide a new and improved control or excitation system for polyphase electric valve converting equipment.

It is a further object of my invention to provide a new and improved electric control or excitation system for polyphase electric valve equipment of the type employing a control member or grid in which the conductivity of the electric valve means may be controlled throughout a substantial portion of each cycle of voltage without employing apparatus of a complicated nature.

Briefly stated, in the illustrated embodiment of my invention I provide an improved excitation or control system for a polyphase electric valve converter, such as a polyphase rectifier of the full-wave type, in which each phase of the rectifying system is provided with a pair of electric valve means oppositely disposed with respect to an associated phase winding. One of the electric valve means of each pair may be of the uncontrolled type and the other may be of the controlled type including a control member which controls the current conducted thereby and, hence, controls an electrical condition, such as the voltage, of an associated load circuit. The excitation means may comprise a plurality of individual excitation circuits connected to the control members of the controlled electric valve means and impresses on the control members a resultant voltage comprising a variable positive unidirectional component and a periodic control component of substantially triangular wave form.

Figure 1:
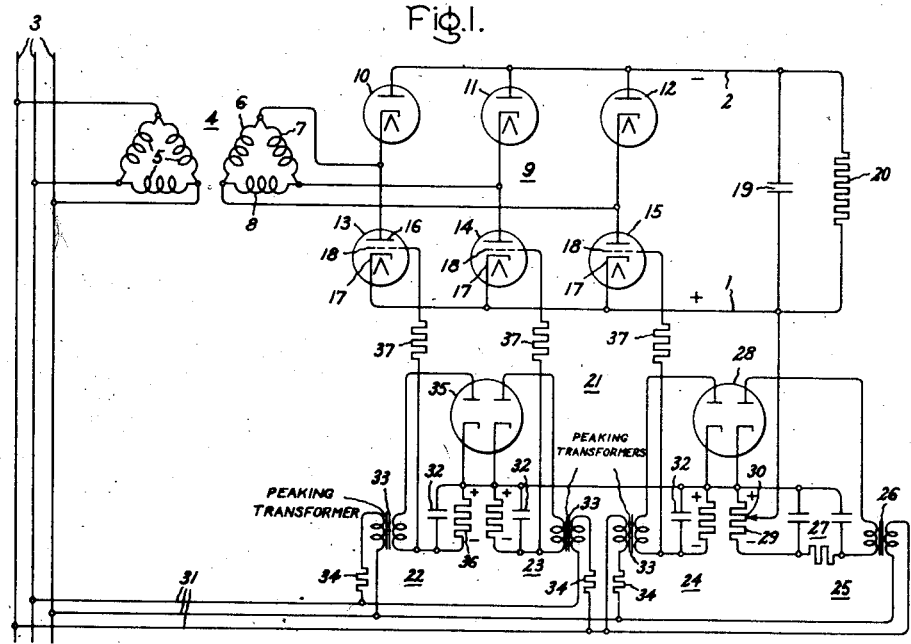
Figure 2:
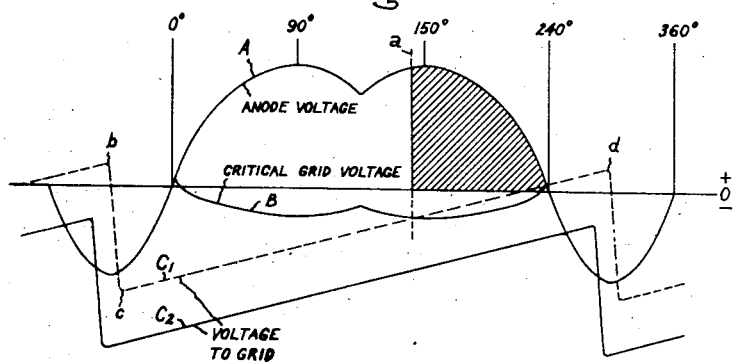

For a better understanding of my invention, reference may be had to the following description taken in connection with the accompanying drawing, and its scope will be pointed out in the appended claims. Fig. 1 diagrammatically illustrates an embodiment of my invention as applied to a polyphase rectifying system for energizing a direct current load circuit, and Fig. 2 represents certain operating characteristics thereof.

Referring now to Fig. 1 of the drawing, I have there illustrated my invention as applied to an electric valve converting system for energizing a direct current load circuit comprising a positive conductor 1 and a negative conductor 2 from a suitable alternating current supply circuit, such as a polyphase alternating current supply circuit 3. The translating apparatus may include a transformer 4 having a plurality of primary windings 5 and a plurality of secondary or phase windings 6, 7 and 8. The translating apparatus also includes a polyphase converter or rectifier 9 which may be of the full-wave type including pairs of oppositely poled electric valve means or electric discharge paths so that current may be conducted in either direction through or with respect to the associated secondary windings 6, 7 and 8. More particularly, I provide electric valve means 10, 11 and 12 which may comprise uncontrolled electric discharge paths and which may be of the type employing an ionizable medium such as a gas or a vapor capable of supporting an arc discharge. In series relation with the electric valve means 10, 11 and 12, I also provide electric valve means 13, 14 and 15, respectively, which are also preferably of the type employing an ionizable medium and which provide electric discharge paths of the controlled type comprising an anode 16, a cathode 17 and a control member or grid 18, the potential of which controls the average value of the unidirectional current conducted thereby and, hence, controls an electrical condition, such as the voltage, of the load circuit. The cathodes 17 of the electric valve means 13—15 are connected to a common juncture and are connected to be maintained at the same potential and are also connected to the positive conductor 1 of the direct current load circuit.

The direct current circuit comprising conductors 1 and 2 may be employed to energize any load device, such as a capacitance 19 which may be continuously or intermittently discharged through a suitable load device or resistance 20.

I provide an excitation means 21 for controlling an output characteristic, such as an output voltage, of the rectifier 9 or for controlling an electrical condition, such as the voltage, of the direct current load circuit. The excitation means 21 may comprise a plurality of excitation circuits 22, 23 and 24 associated with electric valve means 13, 14 and 15, respectively, and also comprise a common means, such as a control circuit 25, which impresses on the control members 18 of electric valve means 13—15, respectively, a variable or controllable positive unidirectional biasing potential.

Referring particularly to the control circuit 25, I provide means for producing a variable or controllable positive unidirectional biasing potential, and this control circuit may include a transformer 26, a filter circuit 27 and a suitable unidirectional conducting device 28 which may include a pair of electric discharge paths, one of which transmits unidirectional current through a voltage divider including a resistance 29. The resistance 29 is provided with an adjustable contact 30 which is connected to the positive terminal or conductor 1 of the direct current load circuit and, hence, is connected to the cathodes 17 of the electric valve means 13—15.

The excitation circuits 22—24, inclusive, are similar in construction and arrangement and these circuits produce electrically displaced or timed electrical impulses or voltages of triangular wave form which, cooperating with the negative unidirectional biasing potential, impress on control grids 18 of electric valve means 13—15 resultant control voltages of sufficient range to permit control of the conductivity of the electric valve means 13—15 throughout the entire range of positive anode voltages applied to the electric valve means. For example, I have found that it is desirable in many full-wave rectifying systems to provide a control voltage which is accurately adjustable to obtain precise control of an output characteristic throughout a substantial portion of one cycle of voltage of the associated alternating current circuit. Generally speaking, I have found that it is frequently desirable in polyphase converting systems, such as full-wave rectifiers or inverters, to provide a control or excitation system wherein the conductivity of an electric valve means may be varied throughout $$\frac{(n-1)360}{n}$$

electrical degrees with respect to the voltage of an associated alternating current circuit, where $n$ is equal to the number of phases of the translating or converting equipment. More particularly, I have found that in three-phase, full-wave rectifying systems in order to obtain an extended range of control of an output electrical condition, such as the output voltage, it is desirable to provide control voltages adjustable throughout 240 electrical degrees where a three-phase alternating current supply circuit energizes a full-wave rectifier. In order to obtain this flexibility of control, I employ a suitable source of alternating current 31 which may be derived from the alternating current supply circuit 3, if desired. The excitation circuits 22—24 each include a capacitance 32 which is charged within a relatively few degrees of the voltage of source 31. In order to obtain rapid charging of the capacitances 32, I employ in each of the excitation circuits 22—24 suitable means for producing a voltage of peaked wave form. If desired, I may employ a saturable inductive device, such as a peaking transformer 33 which is energized from suitable phases of the polyphase source 31 in order to produce the desired electrical displacement between the respective periodic voltages of triangular wave form produced by the excitation circuits. The peaking transformer 33, if desired, may be of the type including a resistance 34 connected in series relation with the primary winding. The capacitances 32 are charged from the peaking transformer 33 through suitable unidirectional conducting devices or electric discharge paths which may be provided by a device 35 having a pair of discharge paths for operation in connection with excitation circuits 22 and 23. The left-hand discharge path of the discharge device 28 may be employed as the rectifying means for excitation circuit 24. I connect across the capacitances 32 suitable discharge circuits and these discharge circuits may comprise resistances 36 of a value to obtain a relatively slow discharge of the capacitances 32 so that the voltage thereof decays substantially linearly and so that the discharge period extends for a period of time somewhat greater than $$\frac{(n-1)360}{n}$$

electrical degrees relative to the voltage of the supply circuit 3. It will be understood that I may employ any suitable arrangement of resistances, inductances or capacitances for the discharge circuit in order to obtain this type of characteristic, and that the specific arrangement shown is merely illustrative of the many ways in which this type of wave form may be obtained. Current limiting resistances 37 may be connected in series relation with control grids 18.

The operation of the embodiment of my invention shown in Fig. 1 will be explained by considering the system when it is operating as a polyphase full-wave rectifier for energizing the direct current load circuit. As is well understood by those skilled in the art, the polyphase rectifier 9 rectifies portions of both half cycles of voltage of each of the phase windings 6, 7 and 8. Furthermore, it will be appreciated that electric valve means 10, 11 and 12 conduct current for substantially 120 electrical degrees during each cycle of voltage of supply circuit 3, but conduct current for only 60 electrical degrees with respect to any one of the other electric valve means including electric valve means 13, 14 and 15. That is, the electric valve means 13, 14 and 15 also conduct current for 120 electrical degrees during each cycle of voltage of the supply circuit 3, but the periods of conductivity thereof are displaced substantially 60 electrical degrees with respect to the periods of the electric valves 10, 11 and 12. For example, if the electric valve means 10, 11 and 12 conduct current for 120 electrical degrees in the order named, the electric valve means 15, 13 and 14 will conduct current during 120 degree intervals lagging the intervals of valves 10, 11 and 12 by substantially 60 electrical degrees.

The magnitudes of the voltage and the power transmitted to the direct current circuit are controllable or adjustable by means of contact 30 associated with resistance 29. By decreasing the magnitude of the positive biasing potential, the average value of the current conducted by electric valve means 13, 14 and 15 is reduced and, hence, the amount of power transmitted to the load circuit is reduced. Conversely, the amount of power may be increased by increasing the magnitude of the positive biasing potential.

Excitation circuits 22, 23 and 24 produce electrically displaced periodic voltages of triangular wave form which cooperating with the positive biasing potential control the conductivities of the electric valve means 13, 14 and 15 and, hence, control the voltage and power output of rectifier 9. Each of the excitation circuits 22—24 effects charge of its capacitance 32 within a relatively short interval of time by virtue of the associated peaking transformer 33. The capacitances 32 are charged from the peaking transformers through the associated electric discharge path and immediately upon charge thereof, the magnitude of the voltage impressed on the grid 18 of the associated electric valve is lowered or rendered more negative. The magnitude of the positive biasing potential is adjusted relative to the periodic voltages of triangular wave form so that the resultant voltages intersect the critical grid voltage characteristic of the electric valve means 13—15 at the desired point in the positive portion of the anode-cathode voltages which will produce the desired output or load voltage.

The operation of the excitation circuits 22—24, inclusive, in the control of electric valve means 13—15 may be more fully appreciated by referring to the operating characteristics shown in Fig. 2. Curve A of Fig. 2 represents the anode-cathode voltage of each of the electric valve means 13, 14 and 15. It will be noted, in the first place, that the anode-cathode voltage is positive during 240 electrical degrees relative to the voltage of circuit 3. This is true, as it will be appreciated by those skilled in the art that there are two adjacent 120 electrical degree periods during which the anode of any one of the electric valve means is positive or more positive than one of the other phase conductors of the three-phase system. Consequently, the resultant grid voltage must be capable of variation or control throughout the 240 degree interval. Curve B represents the critical grid voltage which determines the conductivity of the electric valve means, and curves $C_1$ and $C_2$ represent the resultant grid voltages for different values of positive unidirectional biasing voltage. At time $a$, where the curve $C_1$ intersects the critical grid voltage, the electric valve means is rendered conducting and continues to conduct current during the remainder of the positive portion of its applied anode-cathode voltage as represented by the shaded portion. If the magnitude of the positive biasing potential is decreased sufficiently, it will be apparent that the resultant grid voltage may be lowered so that it does not intersect the characteristic at any point and, hence, the electric valve means would be maintained non-conducting. This condition is represented by curve $C_2$. It will thus be observed that the resultant grid voltage may be varied throughout the 240 electrical degree period.

The operation of the excitation circuits 22—24, inclusive, will now be considered in a more detailed manner relative to the operating characteristics shown in Fig. 2. Referring to curve $C_1$, it will be noted that at a time $b$ the potential of the grid 18 is lowered abruptly. This is due to the charge of the capacitance 32 through the unidirectional conducting device or discharge path from the associated peaking transformer 33. From the time $c$ to time $d$ it will be noted that the voltage impressed on the control grid 18 increases substantially at a linear rate which is due to the discharge of the capacitance 32 through resistance 36. At time $d$, the capacitance 32 is again charged by the peaking transformer 33.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a three-phase alternating current supply circuit, a direct current load circuit, electric translating apparatus connected between said supply circuit and said load circuit and comprising a three-phase full-wave rectifier including three pairs of serially connected unidirectional conducting devices, each pair including in series relation an uncontrolled discharge path and a controlled discharge path including a control member, and means for varying the conductivity of each of said controlled discharge paths throughout 240 electrical degrees of the voltage of said supply circuit and comprising means for impressing on said control members timed electrical impulses of triangular wave form and means for superimposing on said impulses a variable unidirectional biasing potential.

2. In combination, a three-phase alternating current supply circuit, a direct current load circuit, electric translating apparatus connected between said supply circuit and said load circuit and comprising a three-phase full-wave rectifier including three pairs of serially connected unidirectional conducting devices, each pair including in series relation an uncontrolled discharge path and a controlled discharge path including a control member, means for impressing on the control members of the controlled discharge paths a positive unidirectional biasing potential, and a plurality of excitation circuits for impressing on the control members of the controlled discharge paths timed impulses of unidirectional voltage sufficient to overcome the effect of the biasing potential for controlling the conductivity of the controlled discharge paths throughout 240 electrical degrees of the voltage of said supply circuit.

3. In combination, a three-phase alternating current supply circuit, a direct current load circuit, electric translating apparatus connected between said supply circuit and said load circuit and comprising a three-phase full-wave rectifier including three pairs of serially connected unidirectional conducting devices, each pair including in series relation an uncontrolled discharge path and a controlled discharge path including a control member, means for impressing on the control members of the controlled discharge paths a positive unidirectional biasing potential, and a plurality of excitation circuits for producing electrically displaced impulses of voltage sufficient to overcome the effect of the biasing potential and each including a capacitance, a unidirectional conducting device for charging the capacitance and a discharge path for said capacitance, the voltage appearing across said last-mentioned discharge path being impressed on said control member.

4. In combination, an $n$ phase alternating current supply circuit, a direct current load circuit, electric translating apparatus interconnecting said circuits and including $n$ electrically displaced phase windings and $n$ pairs of serially connected electric discharge paths, each pair being connected to a different one of said phase windings and each including in series relation an uncontrolled discharge path and a controlled discharge path, the controlled discharge paths each comprising an anode, a cathode and a control member and the cathodes of the controlled discharge paths being at the same potential, means common to the control members for impressing thereon a positive unidirectional biasing potential, and means for impressing on the control members timed electrical impulses for controlling the conductivity of said controlled discharge paths throughout substantially $$\frac{(n-1)360}{n}$$

electrical degrees relative to the voltage of said supply circuit.

5. In combination, an $n$ phase alternating current supply circuit, a direct current load circuit, electric translating apparatus interconnecting said circuits and including $n$ electrically displaced phase windings and $n$ pairs of serially connected electric discharge paths, each pair being connected to a different one of said phase windings and each including in series relation an uncontrolled discharge path and a controlled discharge path, the controlled discharge paths each comprising an anode, a cathode and a control member and the cathodes of the controlled discharge paths being at the same potential, means common to the control members for impressing thereon a positive unidirectional biasing potential, and means for impressing on the control members periodic voltages of triangular wave form for controlling the conductivity of said controlled discharge paths through substantially $$\frac{(n-1)360}{n}$$

electrical degrees during a cycle of voltage of said supply circuit, where $n$ is greater than 2.

6. In combination, an $n$ phase alternating current supply circuit, a direct current load circuit, electric translating apparatus interconnecting said circuits and including $n$ electrically displaced phase windings and $n$ pairs of serially connected electric discharge paths, each pair being connected to a different one of said phase windings and each including in series relation an uncontrolled discharge path and a controlled discharge path, the controlled discharge paths each comprising an anode, a cathode and a control member and the cathodes of the controlled discharge paths being at the same potential, means common to the control members for impressing thereon a positive unidirectional biasing potential, means for impressing on the control members timed voltages of triangular wave form and comprising a capacitance, a charging circuit for said capacitance including a unidirectional conducting device and a discharge circuit for said capacitance, and means for controlling the magnitude of said biasing potential to control the conductivity of said controlled discharge paths throughout substantially $$\frac{(n-1)360}{n}$$

electrical degrees during a cycle of voltage of said supply circuit.

7. In combination, an alternating current circuit, a direct current circuit, electric translating apparatus connected between said circuits and comprising an electric valve means including a control member, and means for controlling the conductivity of said electric valve means comprising a capacitance, means for charging the capacitance during an interval which is short relative to a half cycle of voltage of said alternating current circuit including a saturable inductive device for producing a voltage of peaked wave form and a unidirectional conducting device, and means for discharging said capacitance during an interval of substantially greater duration than a half cycle of voltage of said alternating current circuit, the voltage appearing across said discharge means being impressed on said control member to control the instant of initiation of conduction of said electric valve means.

8. In combination, a supply circuit, a load circuit, at least one of said circuits being an alternating current circuit, electric translating apparatus connected between said circuits and comprising an electric valve means having a control member, and excitation means for impressing on said control member a periodic voltage of triangular wave form including a capacitance, means for charging said capacitance during an interval which is short relative to a half cycle of voltage of said alternating current circuit including a saturable inductive device for producing a voltage of peaked wave form and a unidirectional conducting device, and a discharge circuit connected across said capacitance to obtain substantially linear decay of the voltage of said capacitance during an interval of substantially greater duration than a half cycle of voltage of said alternating current circuit to determine the instant of initiation of conduction of said electric valve means.

9. In combination, a supply circuit, a load circuit, electric translating apparatus connected between said circuits and comprising electric valve means having a control member, a source of alternating current, and an excitation circuit energized from said source for impressing on said control member a periodic voltage of triangular wave form comprising a capacitance, means for charging said capacitance during a relatively short interval of time compared with the cycle of voltage of said source and comprising a saturable inductive means for producing a voltage of peaked wave form, a unidirectional conducting device connected between said capacitance and said inductive device and a discharge c'rcuit for said capacitance to determine the instant of initiation of conduction of said electric valve means.

ORRIN W. LIVINGSTON.